(12) United States Patent  
Kim et al.

(10) Patent No.: US 9,338,260 B2  
(45) Date of Patent: May 10, 2016

(54) PROTOCOL CONVERSION APPARATUS AND PROTOCOL CONVERSION METHOD

(71) Applicant: SAMSUNG ELECTRONICS CO., LTD., Suwon-si (KR)

(72) Inventors: Hee Dong Kim, Namyangju-si (KR); Dong Ik Lee, Seoul (KR); Yang Don Lee, Suwon-si (KR); Ji Young Cho, Seoul (KR); Jai Ick Chun, Seoul (KR); Min Hyeok Ha, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 81 days.

(21) Appl. No.: 13/734,053

(22) Filed: Jan. 4, 2013

(65) Prior Publication Data

US 2013/0177029 A1    Jul. 11, 2013

(30) Foreign Application Priority Data

Jan. 6, 2012    (KR) .................. 10-2012-0001987

(51) Int. Cl.  
*H04J 3/16* (2006.01)  
*H04L 29/06* (2006.01)

(52) U.S. Cl.  
CPC ...................................... *H04L 69/08* (2013.01)

(58) Field of Classification Search  
CPC ......................................................... H04L 69/08  
See application file for complete search history.

(56) References Cited

U.S. PATENT DOCUMENTS

| | | | |
|---|---|---|---|
| 5,778,189 A * | 7/1998 | Kimura et al. | 709/236 |
| 6,542,516 B1 * | 4/2003 | Vialen et al. | 370/465 |
| 8,537,855 B2 * | 9/2013 | Wieslawa | 370/466 |
| 8,705,547 B2 * | 4/2014 | Lebizay et al. | 370/401 |
| 2002/0075897 A1 * | 6/2002 | Koo et al. | 370/466 |
| 2007/0280287 A1 * | 12/2007 | Samudrala et al. | 370/466 |
| 2010/0246603 A1 * | 9/2010 | Rabie et al. | 370/466 |
| 2013/0177028 A1 * | 7/2013 | Lebizay et al. | 370/466 |
| 2013/0177029 A1 * | 7/2013 | Kim et al. | 370/466 |

* cited by examiner

*Primary Examiner* — Robert Wilson  
(74) *Attorney, Agent, or Firm* — Staas & Halsey LLP

(57) ABSTRACT

A protocol conversion apparatus and a protocol conversion method. The protocol conversion apparatus includes a first control to analyze first protocol data received through a first channel, a protocol mapper to determine whether protocol conversion is required for the first protocol data, and a second control to create second protocol data associated with the first protocol data based on a result of the determination, and to transfer the second protocol to a second channel.

14 Claims, 14 Drawing Sheets

FIG. 3

| COMMANDS OF SOURCE CONTROL \ COMMANDS OF TARGET CONTROL | | A | B | C |
|---|---|---|---|---|
| A | 4097 | – | 8193 | 12289 |
|   | 4096 | – | 8192 | 12890 |
| B | 3000 | 5501 | – | |
|   | 3010 | 5503 | – | |
| C | 2222 | 6000 | 9952 | – |
|   | 2225 | 6002 | 9953 | – |

FIG. 4

```
<ControlA>
 <cmd>
   <desc>command description</desc>
   <command_id>4097</command_id>
   <dest>
      <control_name>ControlB</control_name>
      <command_id>8193</command_id>
   </dest>
   <dest>
      <control_name>ControlC</control_name>
      <command_id>12289</command_id>
   </dest>
 </cmd>
</ControlA >
```

PROTOCOL CONVERSION APPARATUS AND PROTOCOL CONVERSION METHOD

CROSS-REFERENCE TO RELATED APPLICATIONS

This application claims the priority benefit of Korean Patent Application No. 10-2012-0001987, filed on Jan. 6, 2012 in the Korean Intellectual Property Office, the disclosure of which is incorporated herein by reference.

BACKGROUND

1. Field

Embodiments of the present disclosure relate to a protocol conversion apparatus and a protocol conversion method which may easily perform protocol conversion between appliances using different communication protocols.

2. Description of the Related Art

A communication protocol may be various communication rules and methods to facilitate information exchange between devices. The protocol defines a connection or transmission mode between devices, a communication mode, a format of data to be transmitted, an error detection mode, a code conversion mode, transmission speed, etc.

In general, since different types of devices have different communication protocols, protocol conversion is required to perform communication between different types of devices. Especially, in a smart grid environment where various types of appliances exist such as a Home Energy Management System (HEMS) and a Building Energy Management System (BEMS), protocol conversion is required for interworking between appliances. Here, a smart grid is an intelligent power network which optimizes energy efficiency by networking energy-consuming appliances so that power suppliers and power consumers exchange information bi-directionally in real-time.

A smart grid system includes a plurality of power consuming appliances and a power management device to manage power consumed in the appliances. The power management device may include a protocol conversion apparatus which performs protocol conversion for interworking between various appliances. Requirements for the smart grid system may vary according to temporal/spatial changes, and new services may be added or existing services may be modified depending on new requirements A protocol conversion apparatus may be modified according to newly added or modified services.

However, it may be difficult to modify conventional protocol conversion apparatuses due to high dependency between the apparatuses and appliances. Accordingly, it is costly to develop and maintain conventional protocol conversion apparatuses.

Further, conventional protocol conversion apparatuses have a limit on the number of appliances they may accommodate, so that they may not be flexible in dealing with such a situation.

SUMMARY

Therefore, it is an aspect of the present disclosure to provide a protocol conversion apparatus and a protocol conversion method which may easily perform protocol conversion between different types of appliances and may be flexibly met with various requirements.

Additional aspects of the disclosure will be set forth in part in the description which follows and, in part, will be apparent from the description, or may be learned by practice of the disclosure.

In accordance with an aspect of the present disclosure, a protocol conversion apparatus includes a first control to analyze first protocol data received through a first channel, a protocol mapper to determine whether protocol conversion is required for the first protocol data, and a second control to create second protocol data associated with the first protocol data based on a result of the determination and to transfer the second protocol data to a second channel.

The protocol mapper may be an upper layer of a main control which includes the first and second controls.

The protocol mapper may include a map table to store connection information between commands of the first control for which protocol conversion is required and commands of the second control.

The protocol mapper may transfer, when receiving a command associated with the first protocol data from the first control, a command associated with the received command among the commands of the second control registered with the map table to the second control.

The second control may create the second protocol data using the transferred command.

The first channel may be a dedicated channel for a first appliance and the second channel may be a dedicated channel for a second appliance.

The first channel and the second channel may constitute a common channel shared by first and second appliances.

The protocol conversion apparatus may further include an upward dispatcher which is located in a layer between the common channel and the first control and transfers the first protocol data to the first control, and a downward dispatcher which is located in a layer between the protocol mapper and the second control and transfers a result of the determination of the protocol mapper to the second control.

In accordance with another aspect of the present disclosure, a protocol conversion method includes analyzing, by a first control, first protocol data received through a first channel, determining, by a protocol mapper, whether protocol conversion is required for the first protocol data, and creating, by a second control, second protocol data associated with the first protocol based on a result of the determination, and transferring the second protocol to a second channel.

The protocol mapper may be an upper layer of a main control which includes the first and second controls.

The protocol mapper may include a map table to store connection information between commands of the first control for which protocol conversion is required and commands of the second control.

The determining may include receiving a command associated with the first protocol data from the first control, and transferring to the second control a command associated with the received command among commands of the second control registered with the map table.

The creating may include creating, by the second control, the second protocol data using the transferred command.

The first channel may be a dedicated channel for a first appliance and the second channel may be a dedicated channel for a second appliance.

The first channel and the second channel may constitute a common channel shared by first and second appliances.

The method may further include transferring, by an upward dispatcher located in a layer between the common channel and the first control data, the first protocol data to the first control, and transferring, by a downward dispatcher located in a layer between the protocol mapper and the second control, a result of the determination of the protocol mapper to the second control.

BRIEF DESCRIPTION OF THE DRAWINGS

These and/or other aspects of the disclosure will become apparent and more readily appreciated from the following description of embodiments, taken in conjunction with the accompanying drawings of which:

FIG. 3 is a diagram illustrating a map table of FIG. 2;

FIG. 4 is a diagram illustrating an example of the map table;

DETAILED DESCRIPTION

Figure 1:
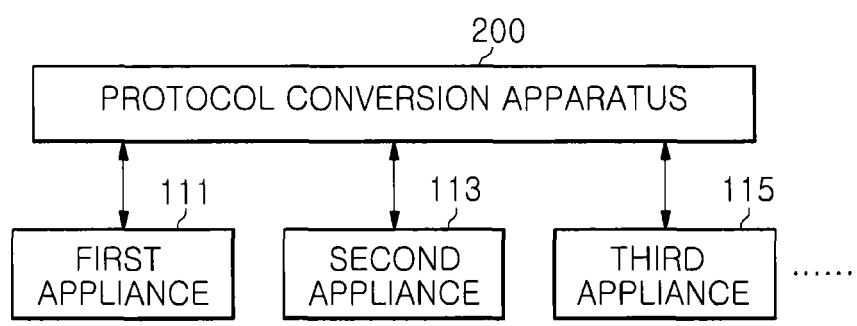
FIG. 1 is a block diagram of a protocol conversion system to which an embodiment of the present disclosure may be applied.

The effects and features of embodiments of the present disclosure, and the methods for achieving them will become apparent to those skilled in the art with reference to the detailed description of embodiments along with the accompanying drawings. However, it is understood that embodiments disclosed herein are merely illustrative and have been made only for a better understanding of the present disclosure. Those skilled in the art will appreciate that various modifications, additions, and substitutions to the specific components are possible, without departing from the scope and spirit of the disclosure which is defined only by the appended claims.

Reference will now be made in detail to embodiments of the present disclosure, examples of which are illustrated in the accompanying drawings, wherein like reference numerals refer to like components throughout.

FIG. 1 illustrates the configuration of a protocol conversion system according to an embodiment of the present disclosure.

As illustrated in FIG. 1, the protocol conversion system includes a plurality of appliances 111, 113 and 115 and a protocol conversion apparatus 200.

The appliances may be digital devices including a digital circuit capable of processing a digital signal. As non-limiting examples, digital devices may include a personal computer, a Personal Digital Assistant (PDA), a washing machine, a dryer, a refrigerator, a phone, a TV, and etc. These appliances may be connected to the protocol conversion apparatus 200 through a network. The network may be a wired network, a wireless network or a hybrid wired-wireless network.

The protocol conversion apparatus 200 may perform protocol conversion for interworking among the various appliances 111, 113 and 115. In FIG. 1, as a non-limiting example, only three appliances are shown, but the number of appliances is not limited thereto. For example, the protocol conversion apparatus may perform protocol conversion for interworking among at least two appliances, or among at least one protocol conversion apparatus and at least one appliance. The protocol conversion apparatus 200 may transmit and receive data to and from the appliances connected thereto. For this purpose, the protocol conversion apparatus 200 may include a communication channel 210 which is a communication path provided by a communication medium which transmits data. As non-limiting examples, the communication medium may include a coaxial cable, an optical fiber cable, infra-red, radio waves, and etc. The types of the communication channel may include a common channel and a dedicated channel. The common channel is a communication channel 210 shared by a plurality of appliances while the dedicated channel is a communication channel 210 occupied by at least two devices communicating data therebetween, for example, the protocol conversion apparatus 200 and a first appliance 111.

When each of the appliances is provided with one channel, the communication channel 210 of the protocol conversion apparatus 200 may include a plurality of dedicated channels each connected to a corresponding appliance. On the contrary, when the appliances share one channel, the communication channel 210 of the protocol conversion apparatus 200 may be implemented as a common channel. In the following descriptions, an embodiment is considered in which the communication channel 210 of the protocol conversion apparatus 200 has a plurality of dedicated channels, followed by another embodiment in which the communication channel 210 of the protocol conversion apparatus 200 is implemented as a common channel.

Figure 2:
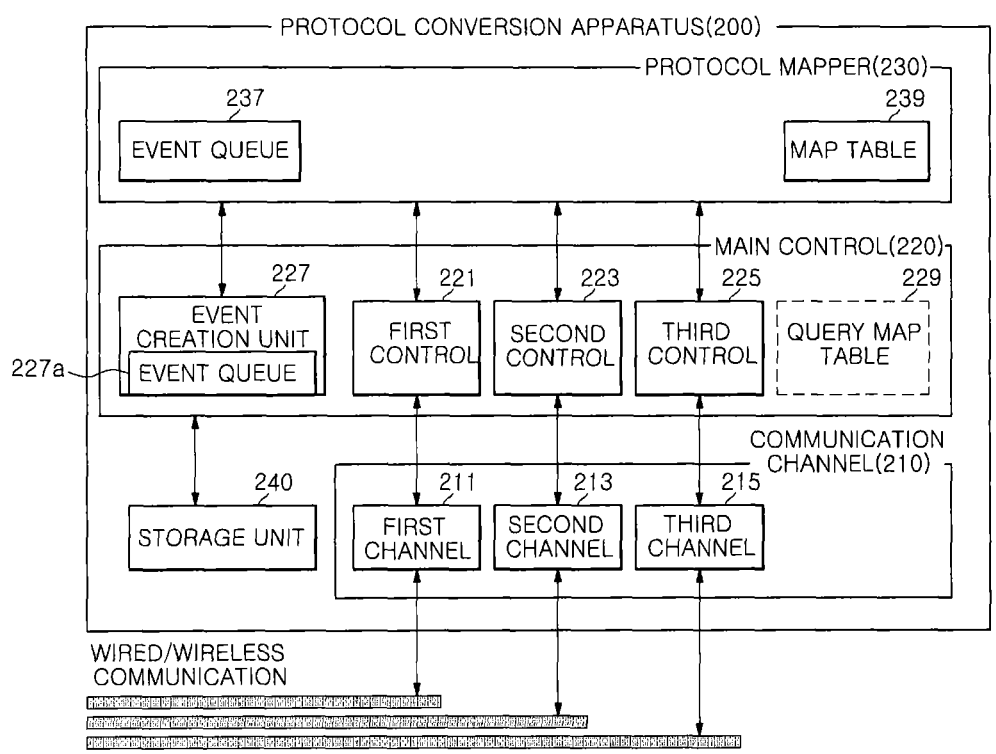
FIG. 2 is a block diagram of a protocol conversion apparatus according to an embodiment of the present disclosure.

FIG. 2 illustrates the configuration of a protocol conversion apparatus 200 according to an embodiment of the present disclosure, in which a layered architecture of components is shown.

As illustrated in FIG. 2, the protocol conversion apparatus 200 may include a communication channel 210, a main control 220, a protocol mapper 230, and a storage unit 240.

The communication channel 210 may include a plurality of dedicated channels 211, 213 and 215. In FIG. 2, as a non-limiting example, only three dedicated channels are shown, but the number of dedicated channels is not limited thereto. For example, the communication channel 210 may include at least one dedicated channel. The dedicated channels (hereinafter referred to as the channels) are provided for transmitting or receiving data to or from the appliances. The channels may perform wired, wireless or hybrid wired-wireless communication with appliances. As non-limiting examples of the communications may include Ethernet, WiFi, Zigbee, RS-232, RS-485 and RS-422.

The main control 220 may include a plurality of controls, a first control 221, a second control 223 and a third control 225 each connected to a corresponding channel among the dedicated channels, a query map table 229 and an event creation unit 227. In FIG. 2, as a non-limiting example, three controls are shown, but the number of controls is not limited thereto. For example, the main control 220 may include less than three controls or more than three controls.

Each of the controls may parse and analyze protocol data received from a corresponding appliance. Then, the controls store the analyzed results in the storage unit 240. At this time, the controls may access the storage unit 240 using the query map table 229. The query map table may be implemented as a query script such as extensible markup language (XML). The query script may be in any programming language to access the storage unit using the query map table 229. After having stored the analyzed results in the storage unit 240, the controls may create event information related to the analyzed protocol data to transfer the created event information to the protocol mapper 230.

Further, each of the controls may create protocol data in order to control a corresponding appliance. For this purpose, the controls may be configured as sets of commands to analyze and create protocol data. The sets of commands may be understood as source code to parse, analyze and create protocol data. In this manner, by incorporating such source code into the controls rather than the protocol mapper 230, dependency between the protocol conversion apparatus 200 and the appliances or among the appliances may be lowered so that each of the controls may have independent attributes. That is, the controls are not modified unless the sets of commands change, even if requirements are changed.

When a periodic or non-periodic event operation is required in the main control 220, the event creation unit 227 notifies the main control 220 thereof. For this purpose, the event creation unit 227 may include an event queue 227a. The event creation unit 227 stores event information about each of the controls in the event queue 227a. Then, the event creation unit 227 transfers the event information stored in the event queue 227a to the protocol mapper 230 in an upper layer in the order that the event information was stored.

The protocol mapper 230 determines whether or not protocol conversion is required for interworking between the protocol conversion apparatus 200 and the appliances or among the appliances, and then transfer the determination to each of the controls. The protocol mapper 230 may include a map table 239 and an event queue 237.

The event queue 237 may store event information transferred from each of the controls or event information transferred from the event creation unit 227. The event information stored in the event queue 237 may be transferred to a target control in the order that the event information was stored.

The map table 239 may store association information about a source control which may use protocol conversion and a target control. More detailed description of the map table 239 will be given with reference to FIG. 3.

As illustrated in FIG. 3, the map table 239 may include mapping information about a command of a source control which may use protocol conversion and a command of a target control. Herein, a source control may refer to a control corresponding to an appliance which issues a command. A target control is a control corresponding to an appliance which receives the command. For example, when a command issued from a first appliance 111 is to be transferred to a second appliance 113 and a third appliance 115, a first control 221 corresponding to the first appliance 111 is a source control while a second control 223 and a third control 225 respectively corresponding to the second appliance 113 and the third appliance 115 are target controls.

In FIG. 3, the symbols "A," "B" and "C" refer to the first, second and third controls 221, 223 and 225, respectively. Referring to FIG. 3, it may be seen that for command ID '4097 (=0x1101)' of the first control 221, the second and third controls 223 and 225 are registered as target controls. It is also may be seen that for command ID '4097 (=0x1101)' of the first control 221, command ID '8193 (=0x2001)' is to be transferred to the second control 223 and command ID '12289 (=0x3001)' is to be transferred to the third control 225.

When the first control 221 receives protocol data having command ID '4097 (=0x1001)' from the first appliance 111, the first control 221 parses and analyzes the received protocol data, and stores the analyzed result in the storage unit 240. Further, the first control 221 transfers the command ID, i.e., '4097 (=0x1001)' to the protocol mapper 230. Then, the protocol mapper 230 finds out the first control 221 among source controls registered with the map table 239, and searches command IDs registered with the first control 221 for '4097 (=0x1001)'. Then, the protocol mapper 230 transfers commands mapped to the searched command ID, i.e., '4097 (=0x1001)' to each of the controls. That is, command ID '8193 (=0x2001)' is transferred to the second control 223 and command ID '12289 (=0x3001)' is transferred to the third control 225.

Subsequently, the second and third controls 223 and 225 may respectively create protocol data using each of the command IDs transferred from the protocol mapper 230. Then, the second control 223 may transmit the created protocol data to the second appliance 113 through the second channel 213, while the third control 225 may transmit the created protocol data to the third appliance 115 through the third channel 215.

FIG. 4 is a program code representation of the above example. In FIG. 4, "ControlA," "ControlB" and "ControlC" represent the first, second and third controls 221, 223 and 225, respectively. Although the program code illustrated in FIG. 4 is represented in XML, it is understood that FIG. 4 illustrates an example and the map table may be represented in other formats or programming languages.

Referring back to FIG. 2, the storage unit 240 may store the list of the controls registered with the protocol conversion apparatus 200. Further, the storage unit 240 may store protocol data parsed and analyzed by each of the controls, and data or an algorithm for creating protocol data by each of the controls. By separately offering the storage unit 240 that stores protocol data parsed and analyzed by each of the controls or data for creating protocol data by each of the controls, it may be possible for each of the controls to perform protocol conversion without source codes for protocol conversion being incorporated into the protocol mapper. The storage unit 240 may be implemented as a non-volatile memory device such as a Read Only Memory (ROM), Random Access Memory (RAM), Programmable Read Only memory (PROM), Erasable Programmable Read Only Memory (EPROM) and a flash memory, a volatile memory device such as a Random Access Memory (RAM), or a storage medium such as a hard disk or optical disc. However, it is apparent that the storage unit 240 is not limited thereto but may be implemented in any other forms known in the art.

Further, although not illustrated in the drawings, the protocol conversion apparatus 200 may include an initialization unit. The initialization unit may initialize the components of the protocol conversion apparatus 200.

Figure 5:
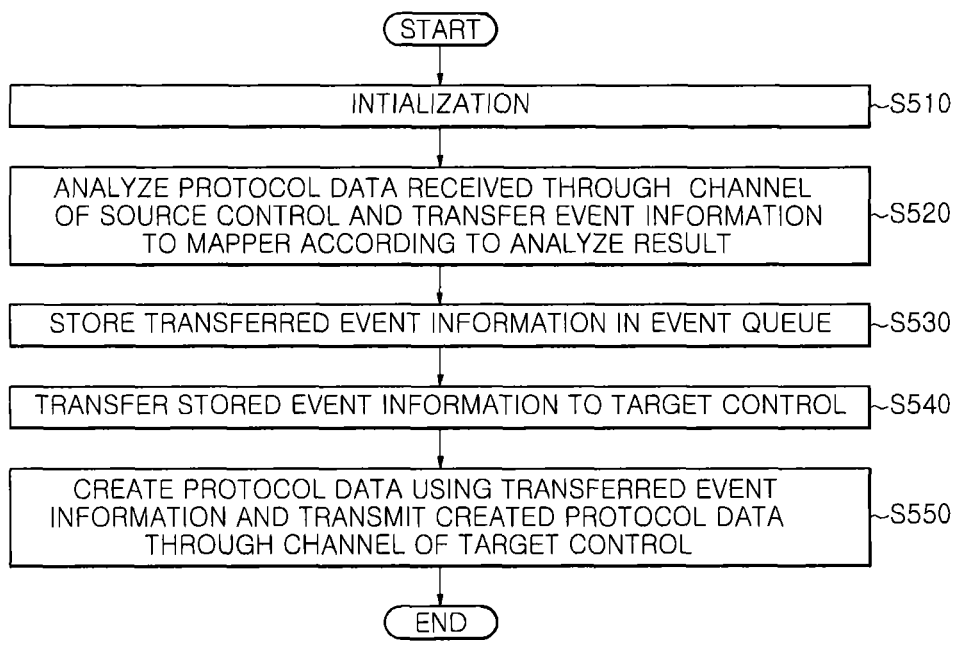
FIG. 5 is a flowchart illustrating an operation of a protocol conversion apparatus according to an exemplary embodiment of the present disclosure.

FIG. 5 is a flowchart illustrating operations of the protocol conversion apparatus 200 according to an exemplary embodiment of the present disclosure.

When appliances are connected to a protocol conversion apparatus 200, the protocol conversion apparatus 200 initializes components (S510). Operation S510 may be performed by an initialization unit. The description of operation S510 will be given below with reference to FIG. 6.

After initialization is completed, if protocol data is received through a channel of a source control, the received protocol data is analyzed, and resulting event information is transferred to a mapper 230 (S520). Operation S520 may be performed by a control. The description of operation S520 will be given below with reference to FIG. 7.

When the event information is transferred, the protocol mapper 230 may store the transferred event information in an event queue 237 in the protocol mapper 230 (S530). The description of operation S530 will be given below with reference to FIG. 8.

Then, the protocol mapper 230 may transfer the event information stored in the event queue 237 to a target control with reference to a map table 239 (S540). The description of operation S540 will be given below with reference to FIG. 9.

The target control creates a protocol data using the event information received from the protocol mapper 230, and transmits the created protocol data through a channel of the target control (S550). The description of operation S550 will be given below with reference to FIG. 10.

Figure 6:
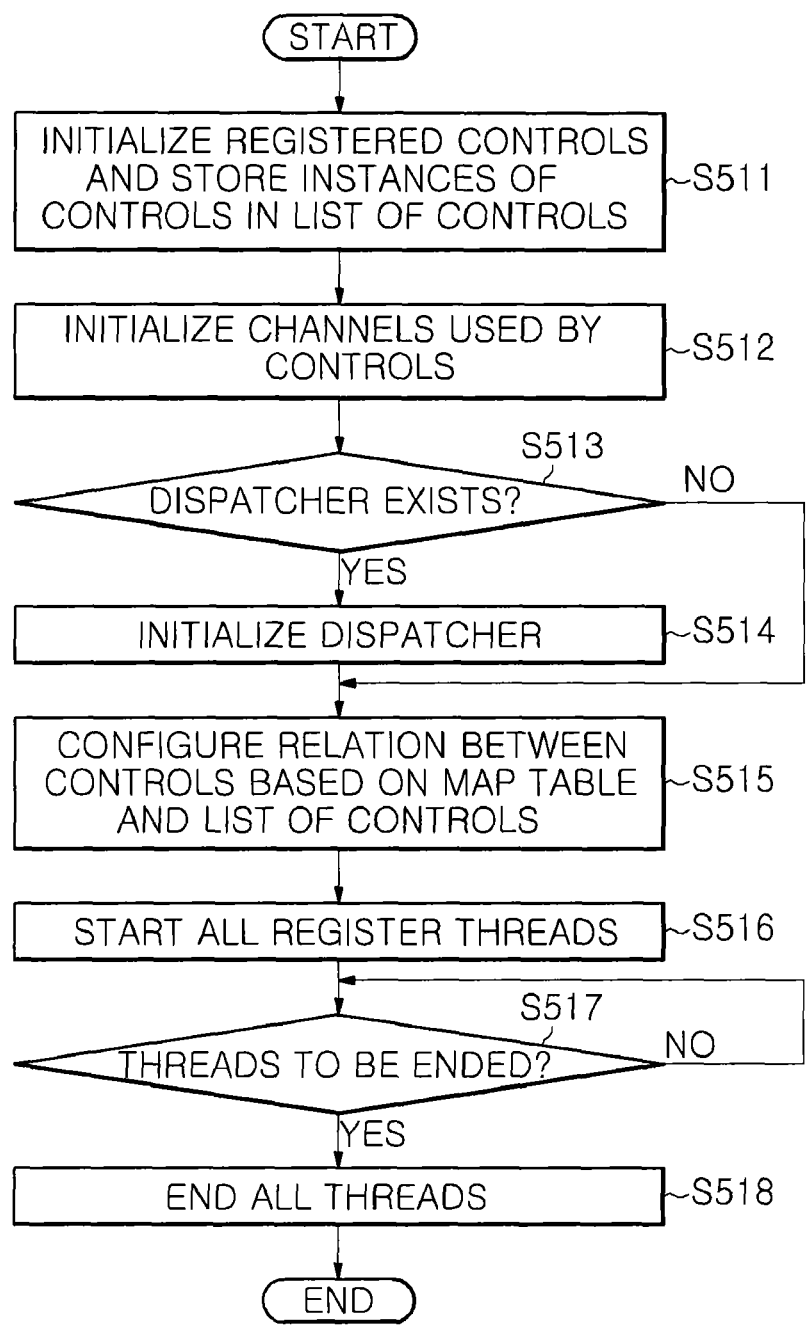
FIG. 6 is a flowchart illustrating operation S510 of FIG. 5 in detail.

FIG. 6 is a flowchart illustrating operation S510 of FIG. 5 in detail.

The initialization unit initializes the controls registered with the protocol conversion apparatus 200, and stores instances of the controls in a list of controls (S511).

Then, channels of the controls are initialized (S512).

The initialization unit determines whether a dispatcher exists (S513). Here, the dispatcher is a component provided in the protocol conversion apparatus 200 when the communication channel 210 of the protocol conversion apparatus 200 is a common channel. The dispatcher may include an upward dispatcher and a downward dispatcher. More detailed description of the dispatcher will be given with reference to FIG. 12. Since the protocol conversion apparatus 200 illustrated in FIG. 2 does not include a dispatcher, the process proceeds from operations S513 to S515.

If it is determined that a dispatcher exists, the dispatcher is initialized (S514).

The protocol mapper 230 establishes association between controls with reference to the map table 239 and the list of the controls (S515).

All of registered threads are started (S516), and it is determined whether the threads have to be ended (S517). Based on a result of the determination, all of the threads are ended (S518).

Figure 7:
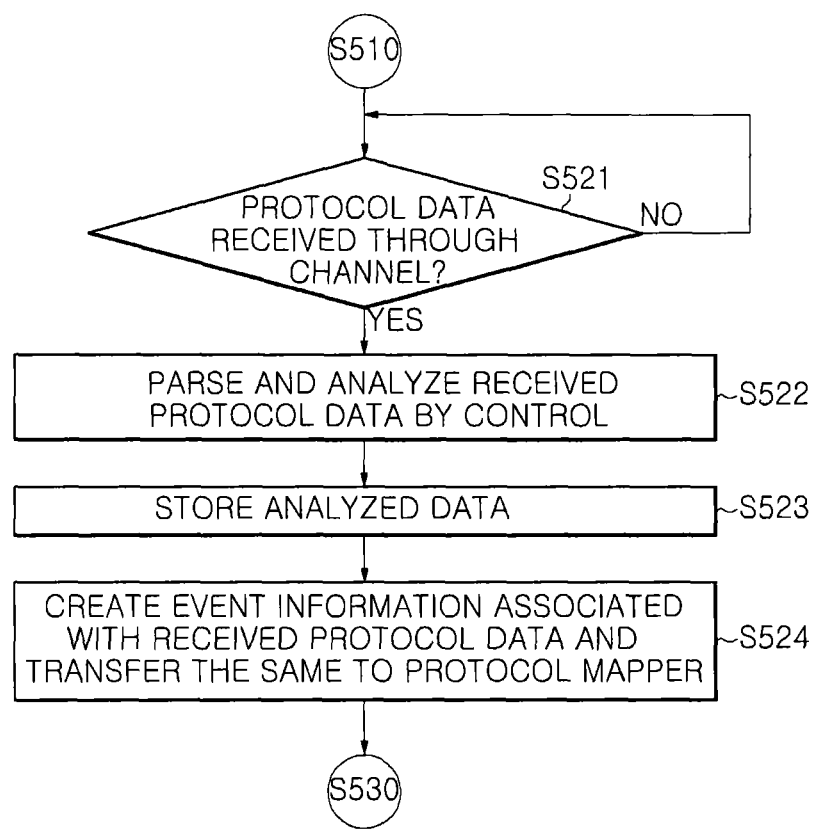
FIG. 7 is a flowchart illustrating operation S520 of FIG. 5 in detail.

FIG. 7 is a flowchart illustrating operation S520 of FIG. 5 in detail.

The controls determine whether protocol data is received through the channels (S521). If it is determined that protocol data is received on a channel, a corresponding control parses and analyzes the received protocol data (S522). Then, the control stores the analyzed data in the storage unit 240 (S523).

Next, the control creates event information related to the received protocol data and transmits the information to the protocol mapper 230 (S524). The event information created by the control may include at least one of an identifier of the source control and a command ID related to the protocol data received by the source control.

Figure 8:
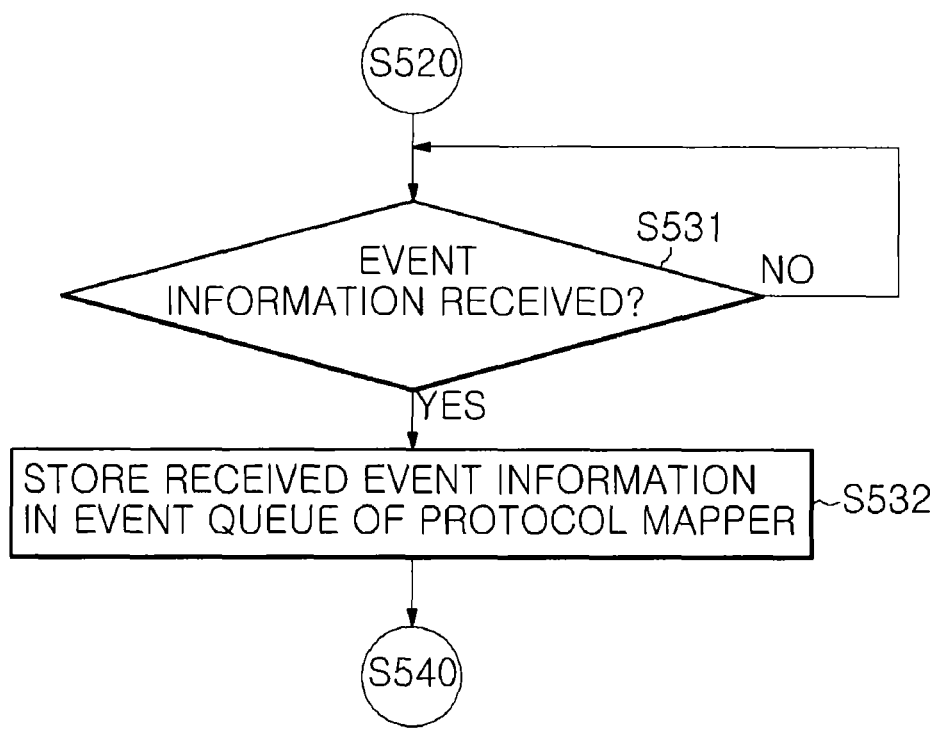
FIG. 8 is a flowchart illustrating operation S530 of FIG. 5 in detail.

FIG. 8 is a flowchart illustrating operation S530 of FIG. 5 in detail.

The protocol mapper 230 determines whether event information is received from the controls or the event creation unit 227 (S531). If it is determined that event information is received, the received event information is stored in the event queue 237 of the protocol mapper 230 (S532).

Figure 9:
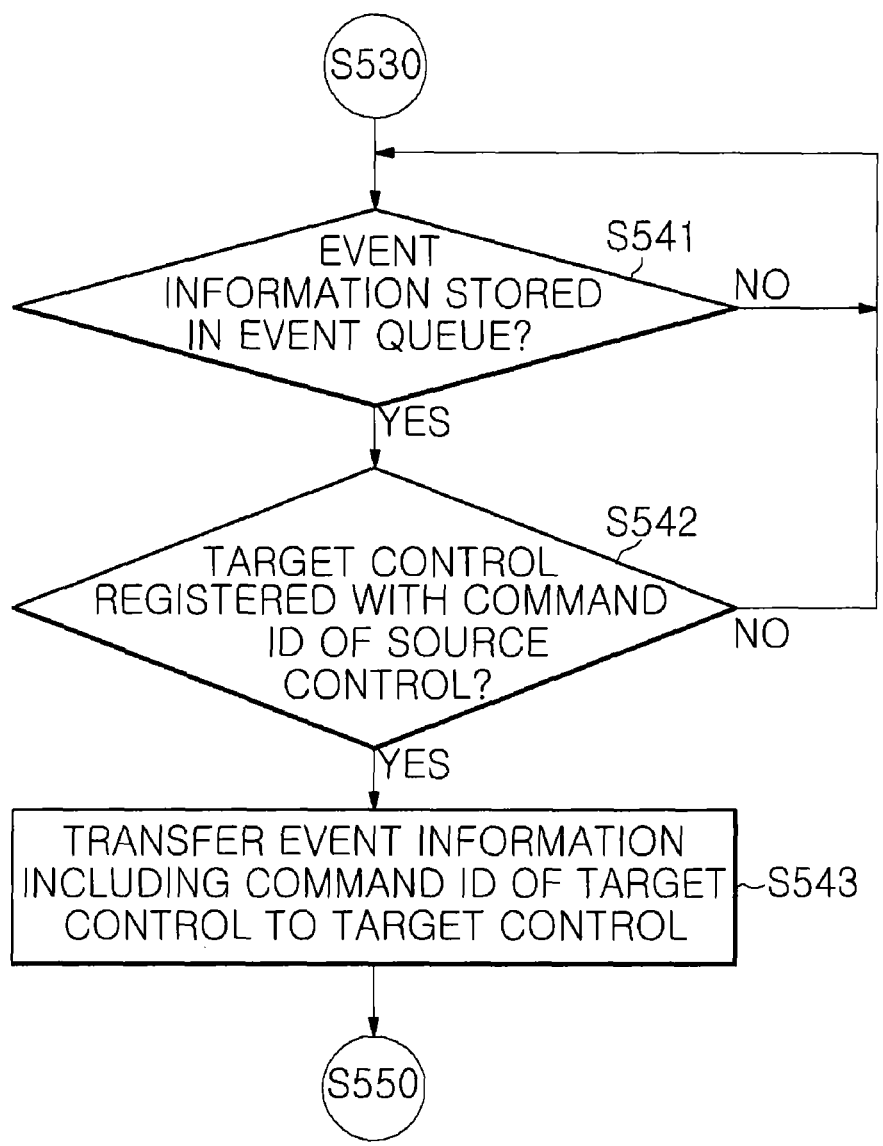
FIG. 9 is a flowchart illustrating operation S540 of FIG. 5 in detail.

FIG. 9 is a flowchart illustrating operation S540 of FIG. 5 in detail.

The protocol mapper 230 determines whether event information is stored in the event queue 237 of the protocol mapper 230 (S541).

If it is determined that event information is stored in the event queue 237, the protocol mapper 230 analyzes the event information. Here, the event information stored in the event queue 237 may include an identifier of a source control and a command ID of the source control.

After analyzing the event information, the protocol mapper 230 determines whether any target control is registered in association with the command ID of the source control, with reference to the map table 239 (S542).

If it is determined that a target control is registered in association with the command ID, the protocol mapper 230 transmits the event information including the identifier of the target control and the command ID of the target control to the target control (S543).

Figure 10:
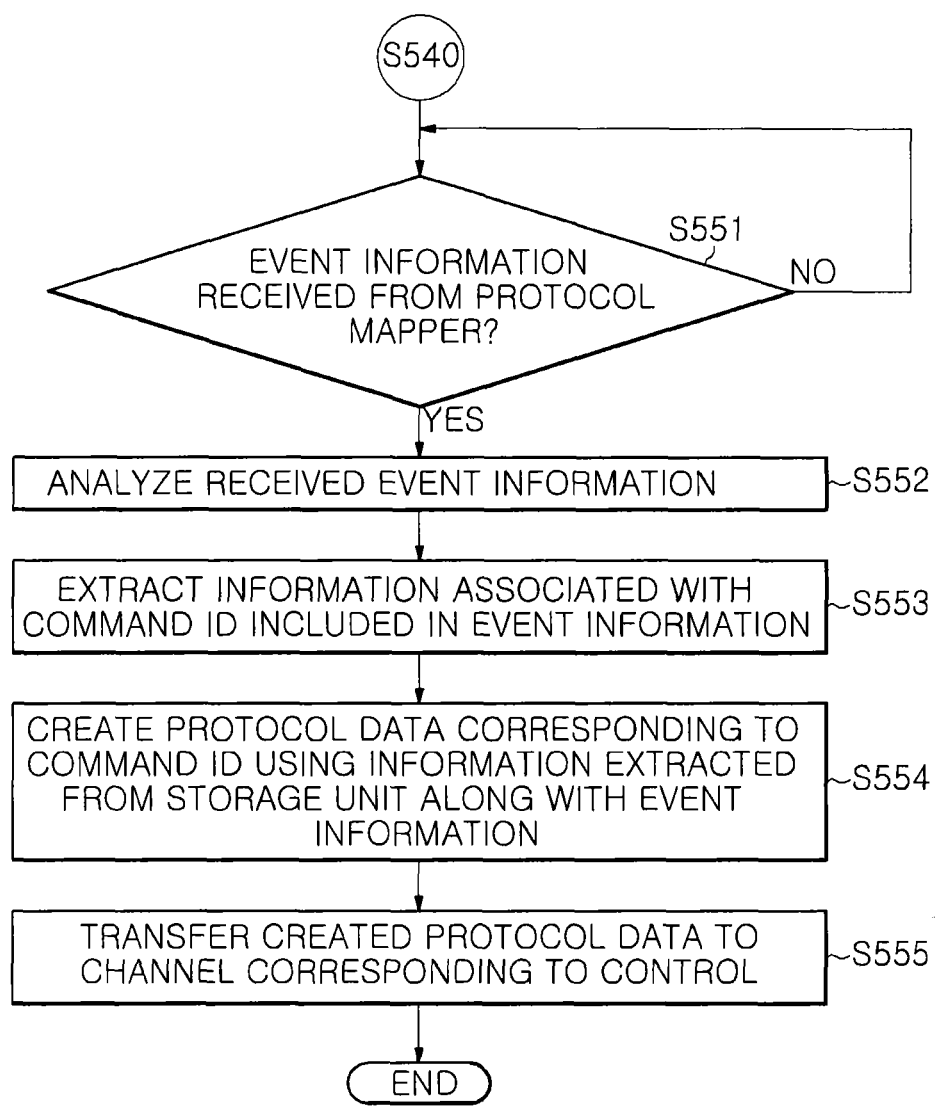
FIG. 10 is a flowchart illustrating operation S550 of FIG. 5 in detail.

FIG. 10 is a flowchart illustrating operation S550 of FIG. 5 in detail.

The controls determine whether event information is received from the protocol mapper 230 (S551).

If it is determined that a control receives event information from the protocol mapper 230, the control analyzes the received event information (S552). Here, the received event information may include an identifier of the target control and a command ID of the target control.

After analyzing the event information, the control extracts from the storage unit 240 information related to the command ID included in the event information (S553). At this time, the control may access the storage unit 240 using the query map table 229.

The control may create protocol data corresponding to the command ID using the event information received from the protocol mapper 230 and the information extracted from the storage unit 240 (S554).

The control transfers the created protocol data to the channel (S555). For example, if the second control 223 creates protocol data, the second control 223 may transfer the created protocol data to a second channel 213. The protocol data transferred to the second channel 213 is transmitted to a second appliance 113 through a communication medium corresponding to the second channel 213.

Figure 11:
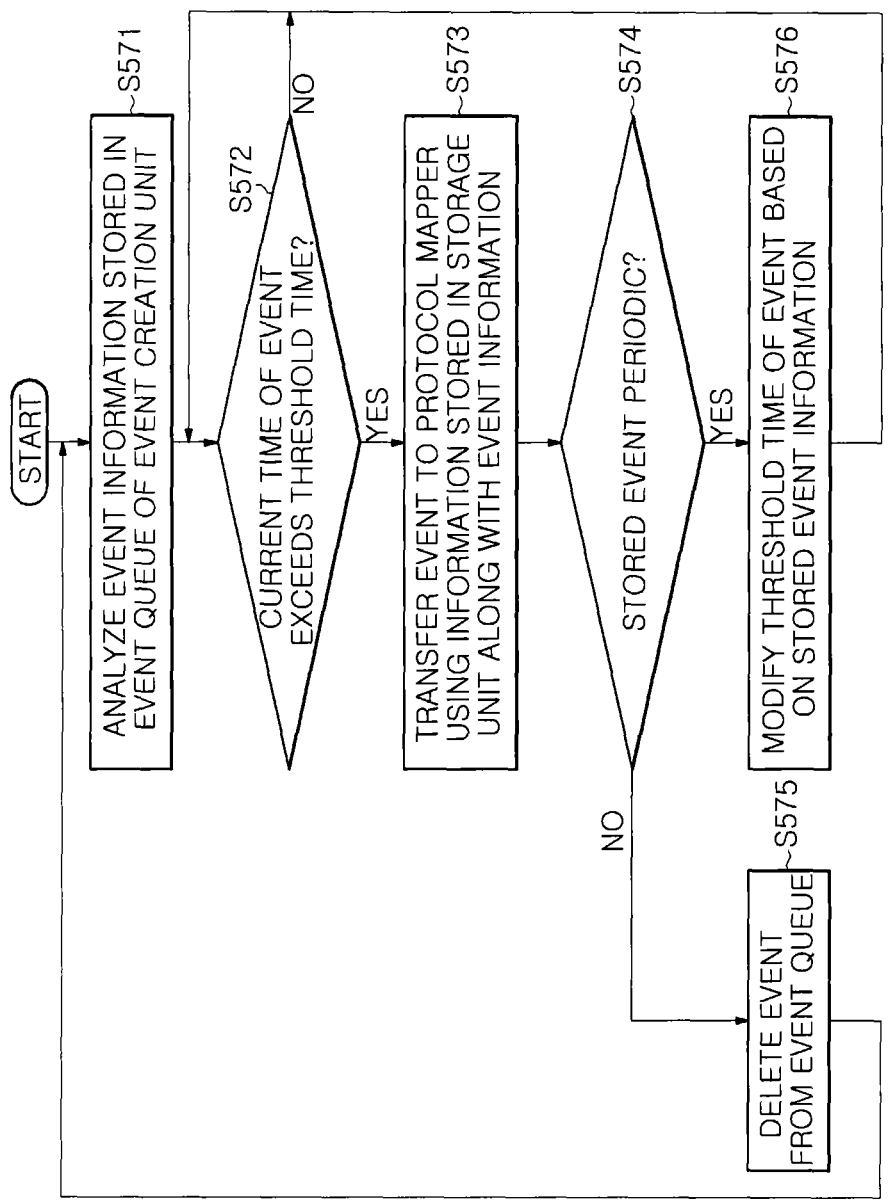
FIG. 11 is a flowchart illustrating operation of an event generating unit of FIG. 2.

FIG. 11 is a flowchart illustrating an operation of an event creation unit 227 of FIG. 2.

The event creation unit 227 analyzes the event information stored in an event queue 227a of the event creation unit 227 (S571) to determine whether a current time of a corresponding event exceeds a threshold time (S572). Here, the current time may refer to a time that has elapsed after a certain event has occurred.

If it is determined that the current time of the event is smaller than the threshold time, the event creation unit 277 continues to check the current time of the event until it reaches the threshold time.

If it is determined that the current time of the event is equal to or greater than the threshold time, the event creation unit 227 transfers the event to the protocol mapper 230 using the event information and the information in the storage unit 240 (S573).

The event creation unit 227 determines whether the event is a periodic or non-periodic event (S574).

If it is determined that the event is a non-periodic event, the event creation unit 227 deletes the event from the event queue 227a of the event creation unit 227 (S575). Although in FIG. 11, the non-periodic event is deleted by the event creation unit 227 from the event queue 227a, the non-periodic event may be manually deleted by a user.

If it is determined that the event is a periodic event, the event creation unit 227 adjusts the threshold time with reference to information of the event such that the event may occur periodically (S576).

Figure 12:
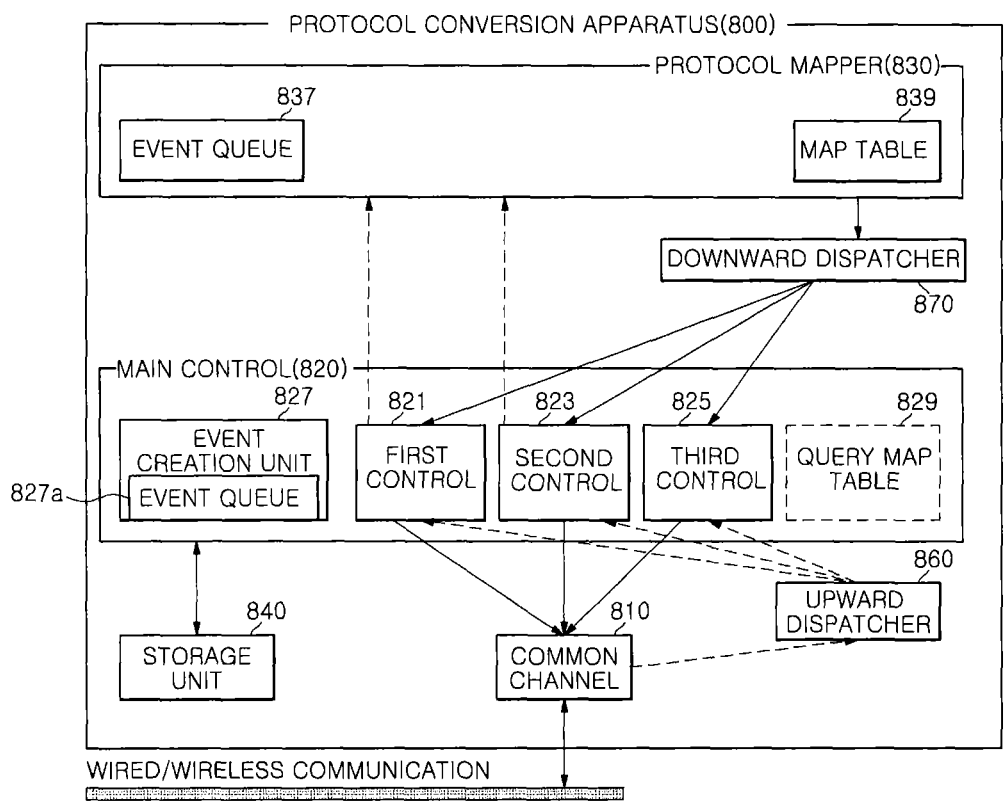
FIG. 12 is a block diagram of a protocol conversion apparatus according to another embodiment of the present disclosure.

FIG. 12 illustrates the configuration of a protocol conversion apparatus 800 according to another embodiment of the present disclosure.

A main control 820 which includes at least one control, and a query map table 829, and an event creation unit 827 including an event queue 827a, a protocol mapper 830 which includes a map table 839 and an event queue 837 and a storage unit 840 illustrated in FIG. 12 are similar to the main control 220, the protocol mapper 230 and the storage unit 240 illustrated in FIG. 2, respectively; and, therefore, descriptions thereof will not be repeated.

The protocol conversion apparatus 800 illustrated in FIG. 12 is different from the protocol conversion apparatus 200 in FIG. 2 in that the communication channel of the protocol conversion apparatus 800 is a common channel 810. In addition, the protocol conversion apparatus 800 illustrated in FIG. 12 is different from the protocol conversion apparatus 200 illustrated in FIG. 2 in that the protocol conversion apparatus 800 further includes an upward dispatcher 860 and a downward dispatcher 870.

The upward dispatcher 860 is located in a layer between the common channel 810 and the main control 820 which includes a first control 821, a second control 823 and a third control 825, and transfers data received at the common channel 810 to each of the controls 821, 823 and 825. The downward dispatcher 870 is located in a layer between the protocol mapper 830 and the main control 820, and transfer event data from the protocol mapper 830 to each of the controls. In FIG. 12, as a non-limiting example, three controls are shown, but the number of controls is not limited thereto. For example, the main control 820 may include less than three controls or more than three controls.

Figure 13:
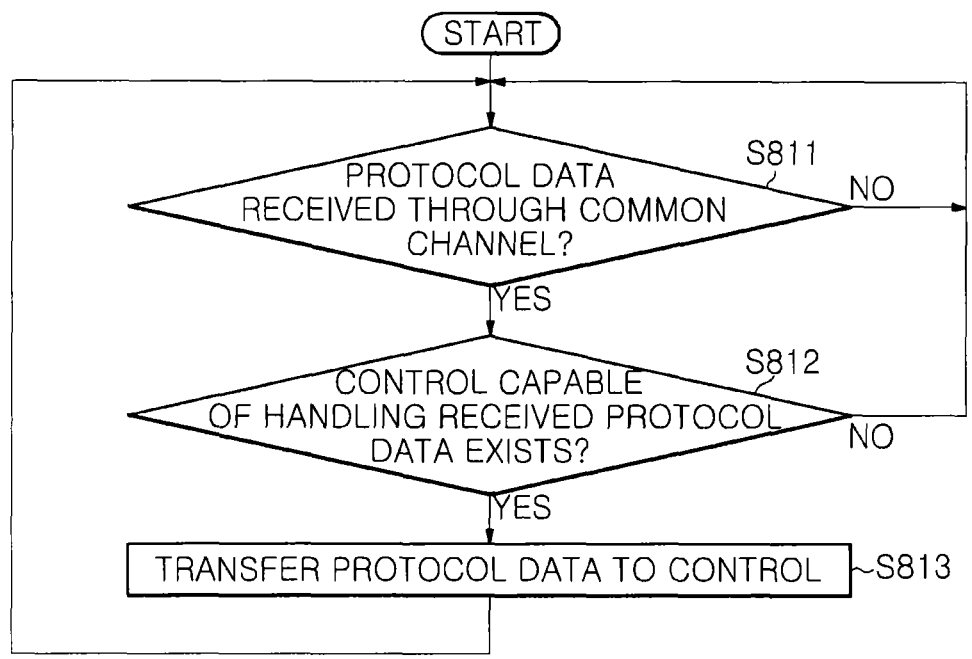
FIG. 13 is a flowchart illustrating an operation of an upward dispatcher of FIG. 12.

FIG. 13 is a flowchart illustrating an operation of an upward dispatcher 860 illustrated in FIG. 12.

The upward dispatcher 860 determines whether protocol data is received at the common channel 810 (S811).

If it is determined that protocol data is received at the common channel 810, the upward dispatcher 860 determines whether there is a control capable of handling the received protocol data, with reference to the data stored in the storage unit 840 (S812). For example, if the received protocol data is a command to turn a light up, it is determined that there is a control capable of handling the command. If a third appliance 115 is a lighting device, the upward dispatcher 860 may determine whether there is a third control 825 which corresponds to the third appliance 115.

If it is determined that there is a control capable of handling the received protocol data, the upward dispatcher transfers the protocol data to the control (S813).

Figure 14:
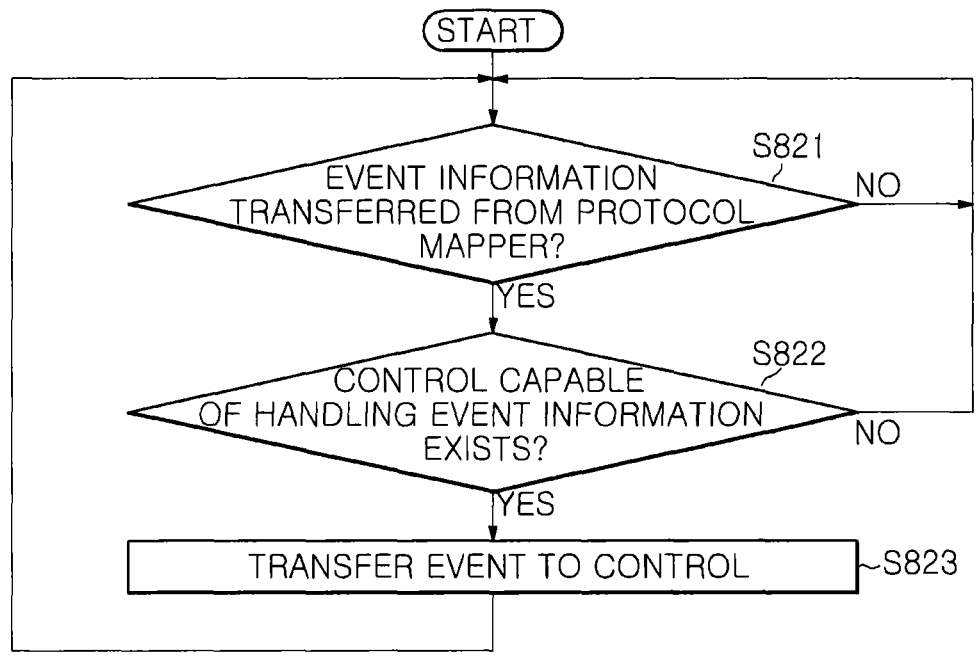
FIG. 14 is a flowchart illustrating an operation of a downward dispatcher of FIG. 12.

FIG. 14 is a flowchart illustrating an operation of a downward dispatcher illustrated in FIG. 12.

The downward dispatcher 870 determines whether event information is transferred from the protocol mapper 830 (S821).

If event information is transferred from the protocol mapper 830, the downward dispatcher 870 may determine whether there is a control capable of handling the event information, with reference to data stored in the storage unit 840 (S822).

If it is determined that there is a control capable of handling the event information, the downward dispatcher 870 transfers the event to the control (S823).

Embodiments of the present disclosure have been described above. In the above embodiments, the components constituting the protocol conversion apparatus may be implemented as modules. Here, a 'module' refers to a software component or a hardware component such as a Field Programmable Gate Array (FPGA) or Application Specific Integrated Circuit (ASIC), and performs a specific function. However, a module is not limited to software or hardware. A module may be stored in an addressable storage medium. Further, a module may execute one or more processors.

As an example, a module may include components such as a software component, an object-oriented software component, a class component and a task component, processors, functions, attributes, procedures, subroutines, segments of program code, drivers, firmware, microcode, a circuit, data, a database, data structures, tables, arrays and variables. Functions provided by components and modules may be combined as a smaller number of components and modules, or may be divided into a larger number of components and modules. Moreover, the components and modules may execute one or more CPUs in a device.

In addition to the above-described embodiments, embodiments of the present disclosure may be implemented as a medium including a computer-readable code/instruction for controlling at least one processing component, i.e., a computer-readable medium. The medium may correspond to a medium that allows computer-readable code to be stored and/or transmitted.

The computer-readable code may be written into a medium or transmitted over the Internet. The medium may include, for example, a recording medium such as a magnetic storage medium (e.g., a ROM, a floppy disk and a hard disk) and an optical recording medium (e.g., CD-ROM, Blu-Ray and DVD), and a transmission medium such as a carrier wave. Further, the medium may be embodied in the form of a signal such as a synthesized signal or a bitstream, according to an embodiment of the present disclosure. The medium may also be distributed over a network so that the computer-readable code may be stored/transmitted and executed in a distributed fashion. Moreover, as a mere example, a processing component may include a processor or a computer processor, and the processing component may be distributed/included in a device.

As is apparent from the above description, embodiments of the present disclosure provide at least the following effects.

A protocol conversion apparatus according to embodiments of the present disclosure, in which a protocol mapper merely transfers, to controls, the determination whether or not protocol conversion is required with reference to a map table and protocol conversion is performed in each of the controls, may be more easily configured than conventional protocol conversion apparatuses, in which protocol mappers perform protocol conversion.

Further, according to embodiments of the present disclosure, if a new appliance is added to the protocol conversion apparatus, the protocol conversion apparatus only requires association between the new appliance and an existing appliance and a control of the new appliance. Therefore, it is easy to maintain the protocol conversion apparatus, and thereby to reduce maintenance costs.

Further, since the protocol conversion apparatus according to embodiments of the present disclosure may be easily configured and maintained, the protocol conversion apparatus may be flexible in dealing with various requirements possibly occurring in a smart grid environment.

Although a few embodiments of the present disclosure have been illustrated and described, it would be appreciated

What is claimed is:

1. A protocol conversion apparatus comprising:
   a memory comprising processor executable instructions;
   at least one hardware processor interfaced to the memory and configured to execute the processor executable instructions in the memory to implement:
   a first controller to analyze first protocol data received through a first channel for a first appliance;
   a protocol mapper to determine whether protocol conversion is required for the first protocol data;
   a second controller to receive the first protocol data from the protocol mapper, to create second protocol data associated with the first protocol data based on a result of the determination by the protocol mapper, and to transfer the second protocol data to a second channel for a second appliance;
   an upward dispatcher located in a layer between a common channel and the first controller, the upward dispatcher transferring the first protocol data to the first controller; and
   a downward dispatcher located in a layer between the protocol mapper and the second controller, the downward dispatcher transferring a result of the determination of the protocol mapper to the second controller,
   wherein the first channel and the second channel constitute the common channel which is shared by the first appliance and the second appliance.

2. The apparatus according to claim 1, wherein the protocol mapper is an upper layer of a main controller, the main controller including the first and second controllers.

3. The apparatus according to claim 1, wherein the protocol mapper includes a map table to store connection information between commands of the first controller for which protocol conversion is required and commands of the second controller.

4. The apparatus according to claim 3, wherein the protocol mapper transfers, upon receiving a command associated with the first protocol data from the first controller, a command associated with the received command among the commands of the second controller registered with the map table to the second controller.

5. The apparatus according to claim 4, wherein the second controller creates the second protocol data using the transferred command.

6. A protocol conversion method comprising:
   analyzing, by a first control, first protocol data received through a first channel for a first appliance;
   determining, by a protocol mapper, whether protocol conversion is required for the first protocol data;
   transferring, by the protocol mapper, the first protocol data to a second control;
   creating, by the second control, second protocol data associated with the first protocol data based on a result of said determining, and transferring the second protocol data to a second channel for a second appliance, the first channel and the second channel constituting a common channel shared by the first appliance and the second appliance;
   transferring, by an upward dispatcher located in a layer between the common channel and the first control, the first protocol data to the first control; and
   transferring, by a downward dispatcher located in a layer between the protocol mapper and the second control, a result of the determination of the protocol mapper to the second control.

7. The method according to claim 6, wherein the protocol mapper is an upper layer of a main control, the main control including the first and second controls.

8. The method according to claim 6, wherein the protocol mapper includes a map table to store connection information between commands of the first control for which protocol conversion is required and commands of the second control.

9. The method according to claim 8, wherein the determining comprises:
   receiving a command associated with the first protocol data from the first control; and
   transferring a command associated with the received command among commands of the second control registered with the map table to the second control.

10. The method according to claim 9, wherein the creating comprises:
    creating, by the second control, the second protocol data using the transferred command.

11. A protocol conversion method comprising:
    receiving first protocol data through a channel of a source control;
    analyzing the received first protocol data by the source control;
    creating event information according to the analyzed first protocol data;
    transferring the event information to a protocol mapper;
    determining whether to perform protocol conversion for the first protocol data;
    transferring the event information to a target control by the protocol mapper;
    creating second protocol data using the transferred event information by the target control; and
    transmitting the second protocol data through a channel of the target control.

12. The method of claim 11, further comprising storing the transferred event information in the protocol mapper.

13. The method according to claim 11, wherein the protocol mapper includes a map table to store connection information between commands of the source and target controls.

14. The method according to claim 11, wherein the event information includes at least one of an identifier of the source control and a command ID of the received protocol data.

* * * * *